(12) United States Patent
Huynh

(10) Patent No.: US 8,660,198 B1
(45) Date of Patent: Feb. 25, 2014

(54) MULTIPATH DIVERSITY IN A QUADRATURE BANDPASS-SAMPLING OFDM RECEIVER

(71) Applicant: Phuong Thu-Minh Huynh, Fairfax, VA (US)

(72) Inventor: Phuong Thu-Minh Huynh, Fairfax, VA (US)

( * ) Notice: Subject to any disclaimer, the term of this patent is extended or adjusted under 35 U.S.C. 154(b) by 0 days.

(21) Appl. No.: 13/709,034

(22) Filed: Dec. 9, 2012

(51) Int. Cl.
*H04L 27/28* (2006.01)
*H04L 27/06* (2006.01)

(52) U.S. Cl.
USPC .......................................... 375/260; 375/340

(58) Field of Classification Search
CPC ........... H04L 2025/03414; H04L 2025/03522; H04L 27/2657; H04L 27/3863; H04L 27/265; H04L 27/2665
USPC ................................................. 375/260, 340
See application file for complete search history.

(56) References Cited

U.S. PATENT DOCUMENTS

| | | | | |
|---|---|---|---|---|
| 5,787,123 | A * | 7/1998 | Okada et al. | 375/324 |
| 2008/0159442 | A1 * | 7/2008 | Tanabe et al. | 375/324 |
| 2011/0292984 | A1 * | 12/2011 | Yoshimoto et al. | 375/224 |

* cited by examiner

*Primary Examiner* — Don N Vo
(74) *Attorney, Agent, or Firm* — Phuong Huynh

(57) ABSTRACT

A quadrature bandpass-sampling receiver providing time diversity for OFDM is provided. A quadrature bandpass-sampling analog-to-digital demodulator down converts an OFDM signal in the RF frequency range to baseband based on a high-frequency sampling clock equal to the RF frequency and generates the in-phase and quadrature outputs in form of high-frequency bit streams. The period of the bit stream is the inverse of the OFDM carrier frequency, which is much higher than the OFDM symbol rate, allows usage of multipath diversity to improve the communication link.

15 Claims, 9 Drawing Sheets

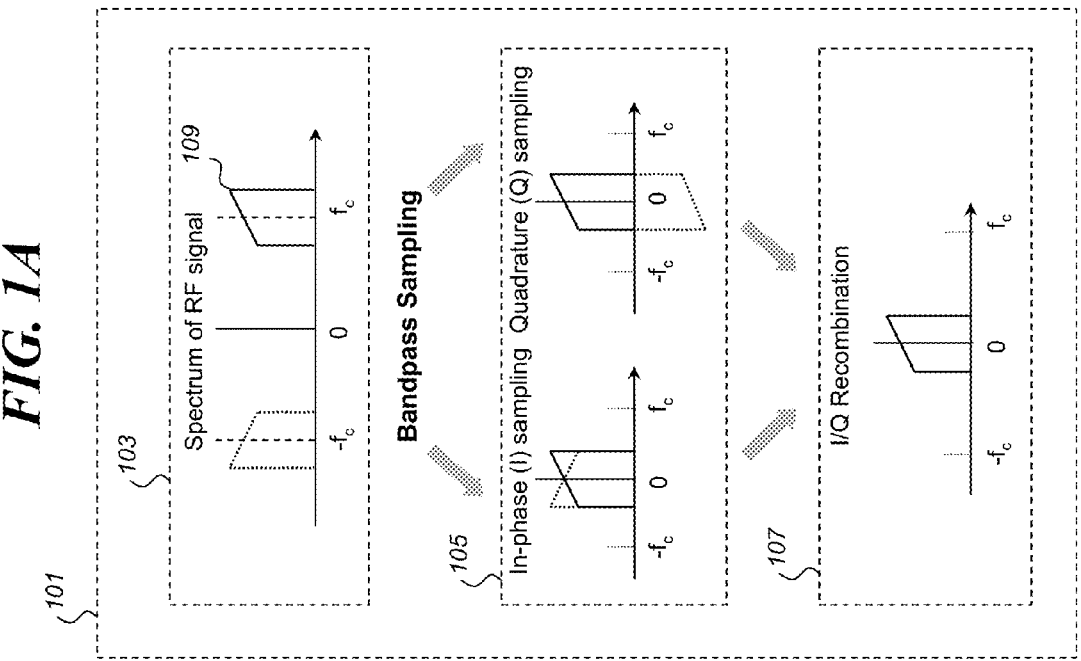

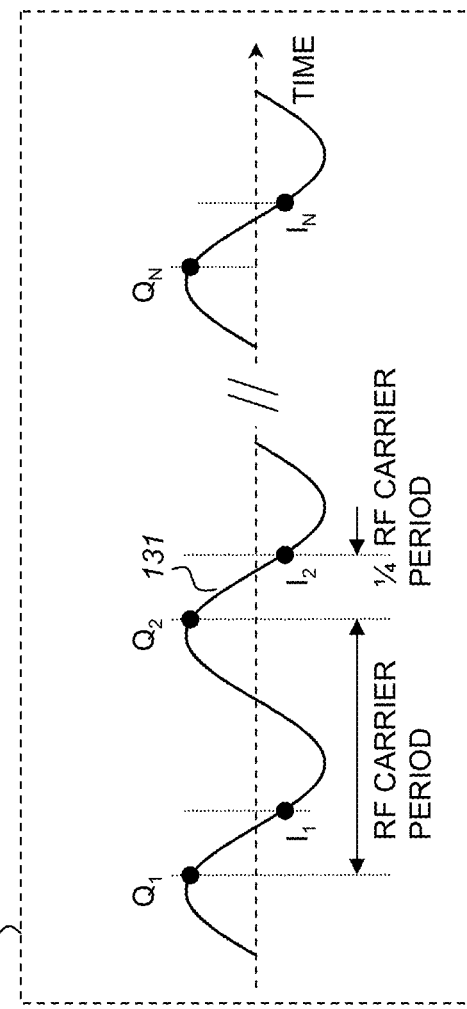

MULTIPATH DIVERSITY IN A QUADRATURE BANDPASS-SAMPLING OFDM RECEIVER

FIELD OF THE INVENTION

The present invention relates to OFDM based receivers, bandpass-sampling architectures, bandpass delta-sigma modulators, and the usage of multipath diversity to enhance communication links.

BACKGROUND OF THE INVENTION

The orthogonal frequency division multiplexing (OFDM) scheme is a well-known high-speed data transmission scheme for next-generation communication technologies. In a conventional OFDM receiver, after being demodulated to baseband and digitized by an analog-to-digital (A/D) converter, an OFDM signal is usually sampled at a low sampling rate, which cannot resolve the multipath to take advantage of time diversity.

In light of the short comings in conventional OFDM receivers, a novel OFDM-based receiver is described herein. It is based on the bandpass sampling technique combined with delta-sigma modulation to demodulate and digitize an RF signal to baseband in a form of high-sampling-rate bit streams. The down-converted in-phase and quadrature output signals are clocked at a high sampling rate, equal to the carrier frequency that modulates the OFDM signal. The in-phase and quadrature outputs are bi-level digital signals, having values of 1 or −1.

Because of the high-sampling rate of the demodulated in-phase and quadrature digital signals (generally having a period of sub-nanoseconds), it is possible to exploit the multipath diversity as the granularity of the sampling period can resolve different RF signal paths due to reflections at objects and buildings reaching the quadrature bandpass-sampling OFDM receiver. Blocks of N-point Discrete Fourier Transform (DFT) can be time shifted with respect to each other before conversion from time to the frequency domain by the DFT, and the resulting in-phase and quadrature complex Fourier coefficients from each DFT block can be maximal ratio combined (MRC) at each subcarrier to provide diversity gain.

SUMMARY OF THE INVENTION

The invention features a circuit for generating K in-phase and quadrature complex Fourier coefficients based on an OFDM signal modulated by a carrier frequency and having K sub-carriers, comprising: a sampling clock generator configured to generate an in-phase sampling clock and a quadrature sampling clock, the quadrature sampling clock being ninety degrees out of phase with the in-phase sampling clock, and the in-phase sampling clock and the quadrature sampling clock having the same frequency; a quadrature bandpass-sampling delta-sigma analog-to-digital demodulator (QBS-ADD) configured to demodulate the OFDM signal from the carrier frequency down to baseband, generate an in-phase signal based on the in-phase sampling clock and the demodulated OFDM signal, and generate a quadrature signal based on the quadrature sampling clock and the demodulated OFDM signal; first through $P^{th}$ bit processors, each of the first through $P^{th}$ bit processors being configured to delay the in-phase signal by an $i^{th}$ delay time equal to $d_i \times D$, to generate an $i^{th}$ delayed in-phase signal, with D being a set delay time, delay the quadrature signal by the $i^{th}$ delay time equal to $d_i \times D$, to generate an $i^{th}$ delayed quadrature signal, and capture the $i^{th}$ delayed in-phase signal and the $i^{th}$ delayed quadrature signal to generate K in-phase Fourier coefficients and K quadrature complex Fourier coefficients, $j^{th}$ in-phase and quadrature complex Fourier coefficients corresponding to a $j^{th}$ OFDM sub-carrier; a maximal ratio combiner configured to linearly combine, for each of the first through $K^{th}$ OFDM sub-carriers, the in-phase complex Fourier coefficients from each of the first through $P^{th}$ bit processors to generate a combined in-phase complex Fourier coefficient, thereby generating K combined in-phase complex Fourier coefficients corresponding to the K OFDM sub-carriers, and linearly combine, for each of the first through $K^{th}$ OFDM sub-carrier, the quadrature complex Fourier coefficients from each of the first through $P^{th}$ bit processors to generate a combined quadrature complex Fourier coefficient, thereby generating K combined quadrature complex Fourier coefficients corresponding to the K OFDM sub-carriers; wherein i is a first index value that varies from 1 to P, and represents a numeric identifier of one of the first through $P^{th}$ bit processors, wherein D is equal to the period of the in-phase sampling clock, wherein j is a second index value that varies from 1 to K, and represents a numeric identifier of one of first through $K^{th}$ OFDM subcarriers, and wherein P and K are integers greater than 1.

Furthermore, each of the first through $P^{th}$ bit processors comprises: an $i^{th}$ cyclic prefix removal circuit configured to receive the $i^{th}$ in-phase signal and the $i^{th}$ quadrature signal and to generate an $i^{th}$ reduced in-phase signal and an $i^{th}$ reduced quadrature signal, respectively; an $i^{th}$ discrete Fourier transform circuit configured to receive N samples of the $i^{th}$ reduced in-phase signal to generate K in-phase complex Fourier coefficients, and to receive N samples of the reduced quadrature signal to generate the K quadrature complex Fourier coefficients, wherein N is a positive integer, wherein N is equal to the carrier frequency that modulates the OFDM signal divided by a sub-carrier spacing of the K OFDM sub-carriers, wherein an in-phase signal and a quadrature signal generated from the QBS-ADD are bi-level digital signals, wherein a frequency of the in-phase sampling clock and a frequency of the quadrature sampling clock are both equal to the carrier frequency that modulates the OFDM signal, and the carrier frequency is between 0.5 GHz to 6 GHz, wherein K is an order of magnitude to three orders of magnitude smaller than N, wherein P is between 1 and the cyclic prefix duration divided by D, the period of the in-phase sampling clock, wherein $d_i$, i being from first through $P^{th}$, form a set of positive integers, $d_i$ is larger than $d_{i-1}$, $d_1$ is equal to zero, and $d_p \times D$ is smaller than the cyclic prefix (CP) duration.

The invention also features a method for generating K in-phase and quadrature complex Fourier coefficients based on an OFDM signal modulated by a carrier frequency and having K sub-carriers, comprising: generating an in-phase sampling clock signal and a quadrature sampling clock signal, the quadrature sampling clock signal being ninety degree out of phase with the in-phase sampling clock signal, and the in-phase sampling clock signal and the quadrature sampling clock signal having the same frequency; demodulating the OFDM signal from the carrier frequency to baseband in response to the in-phase sampling clock signal, to generate an in-phase signal; demodulating the OFDM signal from the carrier frequency to baseband in response to the quadrature sampling clock signal, to generate a quadrature signal; delaying the in-phase signal by first through $P^{th}$ delay times to generate first through $P^{th}$ delayed in-phase signals, an $i^{th}$ delay time being equal to $d_i \times D$, with D being a set delay time; delaying the quadrature signal by the first through $P^{th}$ delay times to generate first through $P^{th}$ delayed quadrature signals, an $i^{th}$ delay time being equal to $d_i \times D$; for each of the first through $P^{th}$ delayed in-phase signals, capturing the $i^{th}$ delayed in-phase signal to generate K in-phase Fourier complex coefficients, $j^{th}$ in-phase complex Fourier coefficient corresponding to a $j^{th}$ OFDM sub-carrier; for each of the first through $P^{th}$ delayed quadrature signals, capturing the $i^{th}$ delayed quadrature signal to generate K quadrature complex Fourier coefficients, $j^{th}$ quadrature complex Fourier coefficient corresponding to a $j^{th}$ OFDM sub-carrier; linearly combining, for each of the first through $K^{th}$ OFDM sub-carrier, the P in-phase complex Fourier coefficients generated based on the first through $P^{th}$ delayed in-phase signals to generate a combined in-phase complex Fourier coefficient, thereby generating K in-phase complex Fourier coefficients corresponding to the K OFDM sub-carriers, and linearly combining, for each of the first through $K^{th}$ OFDM sub-carrier, the P quadrature complex Fourier coefficients generated based on the first through $P^{th}$ delayed quadrature signals to generate a combined quadrature complex Fourier coefficient, thereby generating K quadrature complex Fourier coefficients corresponding to the K OFDM sub-carriers; wherein i is a first index value that varies from 1 to P, and represents a numeric identifier of one of the first through $P^{th}$ bit processors, wherein D is equal to the period of the in-phase sampling clock, wherein j is a second index value that varies from 1 to K, and represents a numeric identifier of one of first through $K^{th}$ OFDM sub-carriers, and wherein P and K are integers greater than 1, Furthermore, capturing the $i^{th}$ delayed in-phase signal to generate the K in-phase Fourier complex coefficients comprises: generating an $i^{th}$ reduced in-phase signal by removing a cyclic prefix from the $i^{th}$ delayed in-phase signal, generating the K in-phase complex Fourier coefficients by using the discrete Fourier transform on N samples of the $i^{th}$ reduced in-phase signal, wherein N is a positive integer, and wherein N is equal to the carrier frequency that modulates the OFDM signal divided by a sub-carrier spacing of the K OFDM sub-carriers, Furthermore, capturing the $i^{th}$ delayed quadrature signal to generate the K quadrature Fourier complex coefficients comprises: generating an $i^{th}$ reduced quadrature signal by removing a cyclic prefix from the $i^{th}$ delayed quadrature signal; generating the K quadrature complex Fourier coefficients using the discrete Fourier transform on N samples of the $i^{th}$ reduced quadrature signal, wherein N is a positive integer, and wherein N is equal to the carrier frequency that modulates the OFDM signal divided by a sub-carrier spacing of the K OFDM sub-carriers, wherein an in-phase signal and a quadrature signal generated from the QBS-ADD are bi-level digital signal, wherein a frequency of the in-phase sampling clock signal and a frequency of the quadrature sampling clock signal are both equal to the carrier frequency that modulates the OFDM signal, and the carrier frequency is between 0.5 GHz to 6 GHz, wherein K is an order of magnitude to three orders of magnitude smaller than N, wherein P is between 1 and the cyclic prefix duration divided by D, the period of the in-phase sampling clock, wherein $d_i$, i being from first through $P^{th}$, form a set of positive integers, $d_i$ is larger than $d_{i-1}$, $d_1$ is equal to zero, and $d_p \times D$ is smaller than the cyclic prefix (CP) duration

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIGS. 1A and 1B are frequency and timing diagrams illustrating down-conversion to baseband based on the bandpass-sampling theory;

DETAILED DESCRIPTION

Figure 2A:
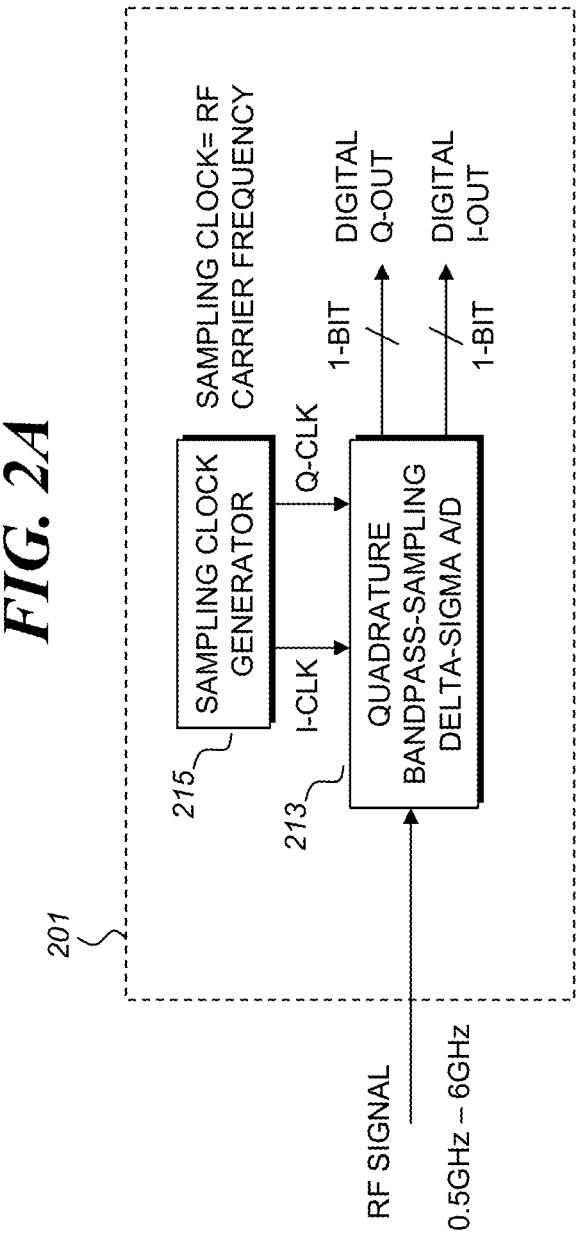
FIG. 2A is a schematic diagram illustrating a quadrature bandpass-sampling RF receiver according to disclosed embodiments.

In overview, the present disclosure concerns electronic devices or units, some of which are referred to as communication units, such as cellular telephones or two-way radios and the like, typically having a capability for rapidly handling data, such as can be associated with a communication system such as an Enterprise Network, a cellular Radio Access Network, or the like. More particularly, various inventive concepts and principles are embodied in circuits, and methods therein for receiving signals in connection with a communication unit.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with in integrated circuits (ICs), such as a digital signal processor or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

FIG. 1A is a frequency diagram 101 illustrating down-conversion of an RF signal to the baseband frequency based on the bandpass-sampling theory; and FIG. 1B is a timing diagram 111 likewise illustrating down-conversion of an RF signal to the baseband frequency based on the bandpass-sampling theory. A communication transmitter is employed to modulate the information to a carrier frequency $f_C$ and transmit the RF signal over the air. For example, conventional cellular phone carrier frequencies are currently set at either 900 MHz or 1800 MHz. In the frequency domain, the transmitted information in the frequency diagram 103 can be seen centered at the carrier frequency $f_C$, where the width of the shaped object corresponds to the bandwidth of the transmitted information. Note that the transmitted object is mirrored into the negative frequencies along the zero-frequency axis.

The timing diagram 111 illustrates a sinusoidal waveform 131 at the RF carrier frequency. The in-phase and quadrature signals, which carry the communicating information, slowly modulate the amplitude and/or the phase of the sinusoidal waveform 131, depending on the modulation scheme employed in the communication system. In a quadrature bandpass-sampling receiver, the sampling rate is set equal to the RF carrier frequency $f_C$, and only two respective sampled data points for every period of the RF carrier are provided, as shown in the timing diagram 111. The first sequence of sampled data points $I_1, I_2, \ldots, I_N$ corresponds to the in-phase (I) sequence while the second sequence of sampled data points $Q_1, Q_2, \ldots, Q_N$ corresponds to the quadrature (Q) sequence. Note that the time duration in between adjacent sampled points of each sequence is always, $$\frac{1}{f_C},$$

the RF carrier period, and the time duration between a Q sampled point and an adjacent I sampled point is always, $$\frac{1}{4f_C},$$

or one quarter of the RF carrier period.

Bandpass sampling the sinusoidal waveform 131 removes the high frequency RF waveform and retains only the slowly-varying amplitude and/or phase of the communicating information that was modulated onto the RF carrier. By virtue of the bandpass sampling theory, the in-phase and quadrature modulated signals are down-converted to baseband, or DC, as illustrated in the frequency diagram 105 of FIG. 1A. The sampled I and Q sequences can be recombined to re-construct the transmitted in-phase and quadrature signals as shown in the frequency diagram 107.

Figure 2B:
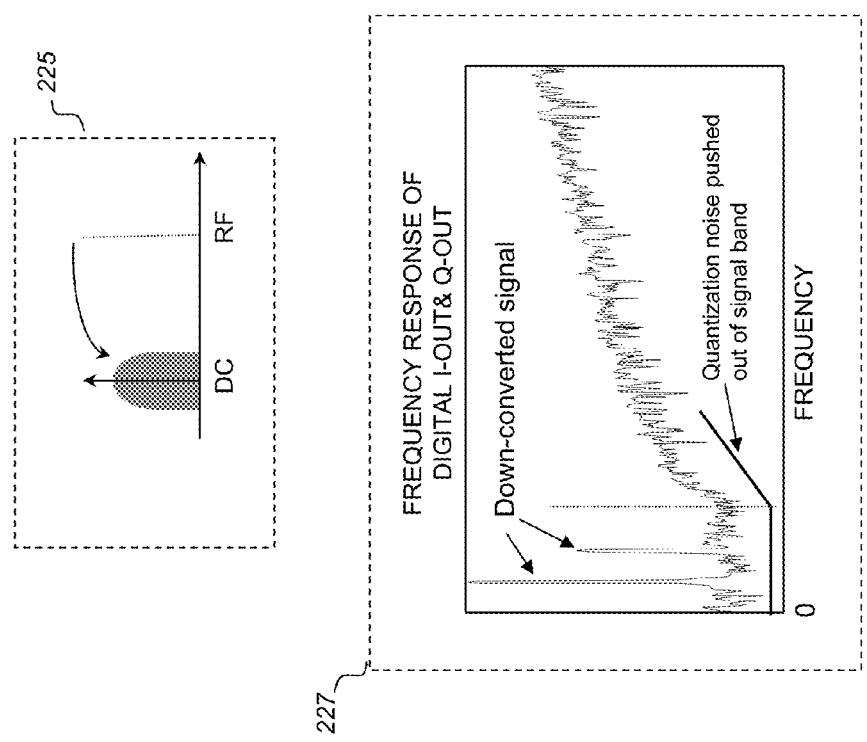
FIG. 2B are graphs illustrating output signals of the receiver in FIG. 2A, according to disclosed embodiments.

Referring now to FIG. 2A, a schematic diagram illustrating a conventional quadrature bandpass-sampling receiver is provided, which comprises a sampling clock generator 215, and a quadrature bandpass-sampling delta sigma analog-to-digital demodulator (QBS-ADD) 213. FIG. 2B shows the frequency diagrams 225, and 227 that illustrate the frequency characteristics of the QBS-ADD 213 output signals, I-OUT and Q-OUT.

The RF signal, which is located between 0.5 GHz and 6 GHz, is bandpass-sampled by the QBS-ADD based on the in-phase sampling clock, I-CLK, and the quadrature sampling clock, Q-CLK, which are generated by the sampling clock generator 215. As discussed with respect to FIGS. 1A and 1B, the in-phase sampling clock and the quadrature sampling clock are separated from each other by ninety degrees, the in-phase sampling clock frequency is equal to the quadrature sampling clock frequency, and both are equal to the RF signal carrier frequency. The communicating in-phase and quadrature information embedded in the RF signal are demodulated to baseband by quadrature clocks, I-CLK and Q-CLK, respectively, and the corresponding digital I-OUT and Q-OUT signals are generated. The frequency diagram 225 illustrates the signal demodulation to baseband from the RF frequency by the QBS-ADD 213. Unlike other conventional RF receivers where the in-phase and quadrature demodulated signals are digitized by a pair of A/Ds at high-resolution and low sampling rate, the QBPS-ADD 213 is a delta-sigma type converter, which produces a stream of bi-level digital I-OUT and Q-OUT signals clocked at a sample rate equal to the RF signal carrier frequency. The frequency diagram 227 illustrates the spectrum profile of typical I-OUT and Q-OUT signals. Even though the QBS-ADD outputs have 1-bit resolution, the quantization noise is pushed out of the signal band yielding high-resolution I-OUT and Q-OUT signals.

Figure 3:
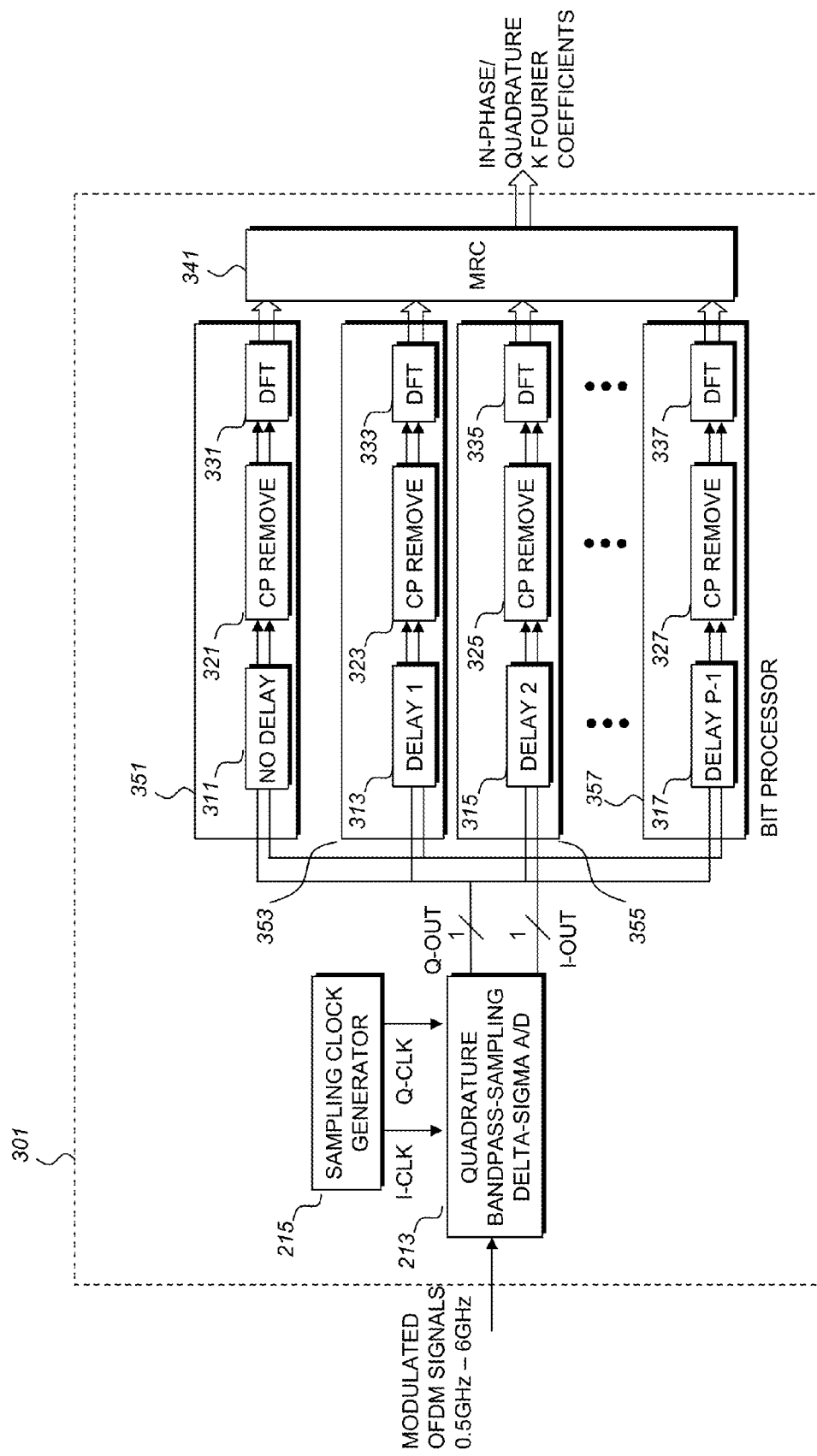
FIG. 3 is a schematic diagram illustrating an exemplary bandpass-sampling receiver architecture using multipath diversity for OFMD according to disclosed embodiments.

Referring now to FIG. 3, a schematic diagram illustrating an exemplary OFDM receiver 301 in accordance with one or more embodiments will be discussed and described. The OFDM receiver comprises a QBS-ADD 213, a sampling clock generator 215, a maximal ratio combiner MRC 341, and first through $P^{th}$ bit processor 351, 353, 355, and 357, each of which comprises one of first through $P^{th}$ delay elements 311, 313, 315 and 317, respectively, one of first through $P^{th}$ cyclic prefix remove blocks 321, 323, 325 and 327, respectively, and one of first through $P^{th}$ DFT blocks 331, 333, 335 and 337, respectively.

The bi-level digital signals Q-OUT and I-OUT are serialized out at the I/Q sampling clock rate, which is equal to the carrier frequency of the input RF signal (i.e., between 0.5 GHz to 6 GHz in the disclosed embodiment). The first through $P^{th}$ delay elements 313, 315 and 317 operate to produce replicas of the initial Q-OUT and I-OUT bit streams delayed by an integer number of samples. The first through $P^{th}$ cyclic-prefix remove blocks 321, 323, 325 and 327 operate to remove the cyclic prefixes in the OFDM symbol; namely contiguous sequences of the serial I-OUT and Q-OUT bit streams corresponding to the length of the cyclic prefix are periodically removed. N samples of Q-OUT and I-OUT bits are captured by the first through $P^{th}$ DFT blocks 331, 333, 335 and 337; and the resulting sets of K in-phase and quadrature complex Fourier coefficients are generated from the DFT blocks. The complex Fourier coefficients are maximal ratio combined at the OFDM sub-carrier level by the MRC 341 to enhance the robustness of the communication link and yield the final K in-phase and quadrature complex Fourier coefficients.

An OFDM receiver requires a DFT processor such as one of the first through $P^{th}$ DFT 331, 333, 335 and 337 to transform the demodulated signals in the time domain to OFDM sub-carriers in the frequency domain, which carry the transmitted data. For example, the $4^{th}$ generation long term evolution (4G LTE) wireless standard specifies flexible data bandwidths from 1.25 MHz, which encompasses 128 sub-carriers, up to 20 MHz, which encompasses 2048 sub-carriers. Regardless of the data bandwidths, the basic sub-carrier spacing is always 15 KHz. In order to capture correctly the OFDM sub-carriers from the first through $P^{th}$ DFT processors 331, 333, 335 or 337, the bit-stream rate of signals Q-OUT and I-OUT at the output of the QBS-ADD 213 must be an integer multiple of the sub-carrier spacing. Since the QBS-ADD 213 samples at the OFDM carrier frequency, the above requirement dictates the OFDM carrier frequency at the QBS-ADD 213 input being an integer multiple of the received OFDM sub-carrier spacing.

The ratio between the high sampling rate of the QBS-ADD 213 and the OFDM sub-carrier spacing, N, which is the number of sample points needed for the DFT transform, could be on the order of $10^5$. But only a low number of DFT coefficients, which is equal to the number of OFDM sub-carriers, K, are needed. The high over-sampling rate of I-OUT and Q-OUT being able to resolve multipath in the received OFDM signal down to sub-nanoseconds is one advantage of the QBS-ADD 213 as compared to conventional RF OFDM receivers.

Figure 4:
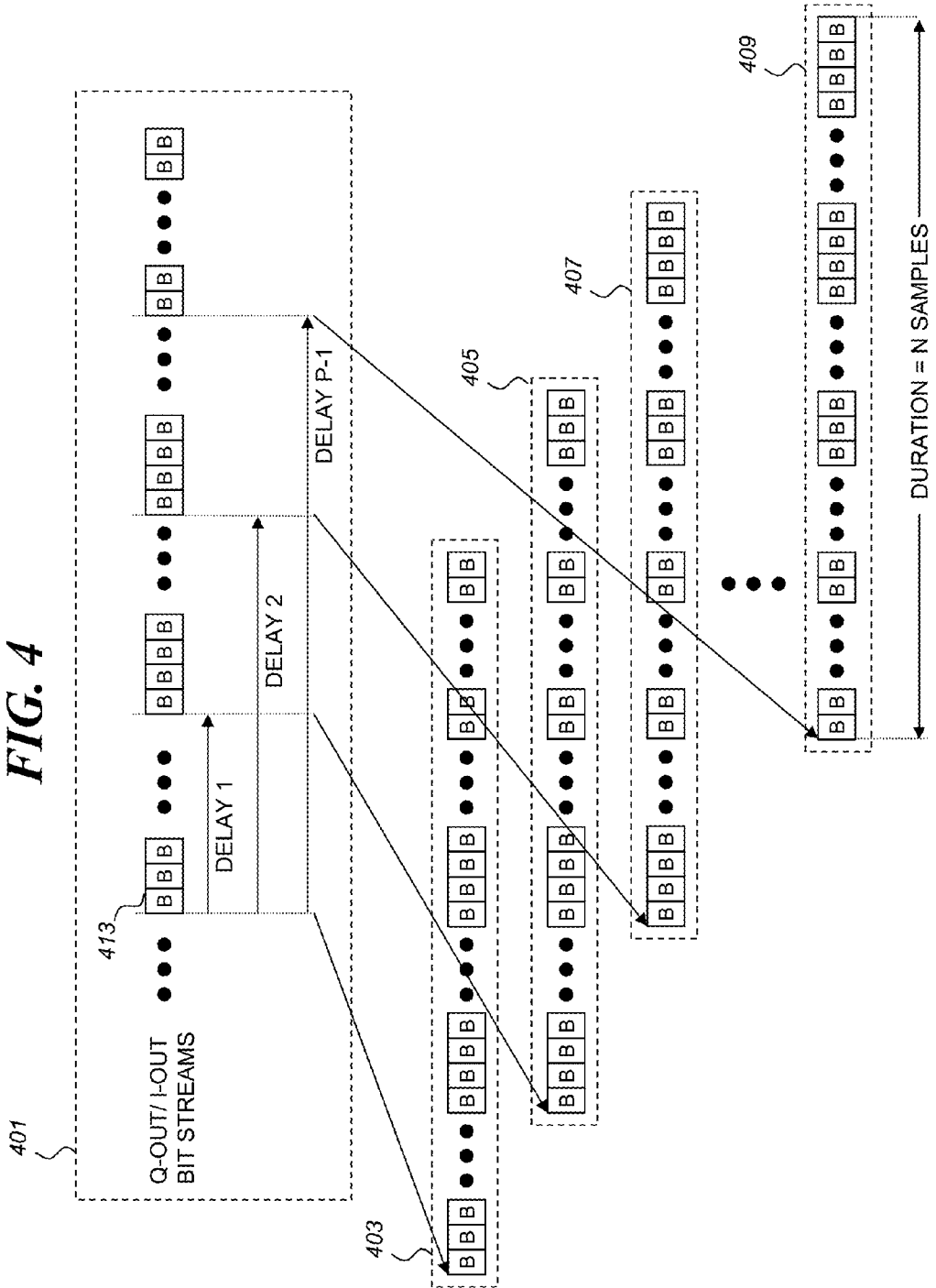
FIG. 4 is a timing diagram illustrating time-shifted blocks of data according to disclosed embodiments.

FIG. 4 illustrates the concept of using time diversity inherent in the QBS-ADD 213 to enhance the communication link. Block 401 depicts the bit-stream of either Q-OUT or I-OUT, where sub-block B 413 denotes a single bit streamed in time. If the multipath components are delayed in time more than a bit duration, which is on the order of a nanosecond, time delayed versions of the original Q-OUT/I-OUT signal can be combined in order to improve the signal-to-noise ratio. FIG. 4 shows a (P-1) number of time delayed versions of the Q-OUT/I-OUT bit stream, 405, 407 and 409, each of which is delayed with respect to the original bit stream 403 by an integer number of bit duration. Note that DELAY 1 is smaller than DELAY 2, which is itself smaller than DELAY P-1. Block 403 denotes the capture of N samples of the original version of Q-OUT and I-OUT; block 405 denotes N samples of Q-OUT and I-OUT delayed by DELAY 1; block 407 denotes N samples of Q-OUT and I-OUT delayed by DELAY 2; and block 409 denotes N samples of Q-OUT and I-OUT delayed by DELAY P-1.

Figure 5:
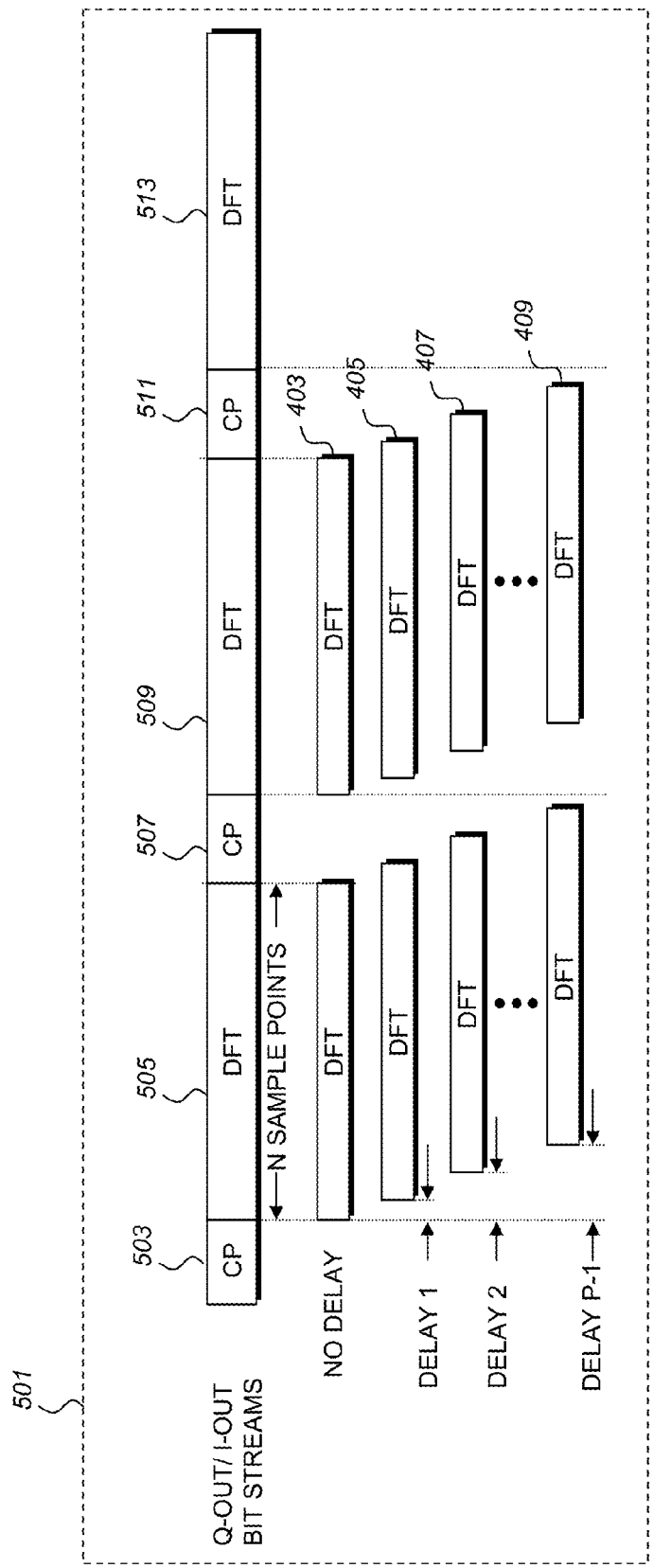
FIG. 5 is a schematic diagram illustrating exemplary time-shifted blocks of data in an OFDM received bit stream according to disclosed embodiments.

FIG. 5 illustrates exemplary time-shifted blocks of data with respect to the received I-OUT/QOUT bit streams. The received Q-OUT and I-OUT bit streams comprise sequences of the cyclic prefix (CP) 503, 507, 511 duration followed by the OFDM symbol time span, DFT 505, 509, and 513, which corresponds to N sampled points. In general, the CP duration is selected so that in the worst case multipath environment, inter-symbol interference (ISI) should not occur; i.e. the previous OFDM symbol denoted by the DFT 505, due to multipath delay, should not spill beyond the CP 507 and over to the DFT 509. Therefore, the time-shifted delay versions DFT 405, 407 and 409 should not be delayed more than the CP duration as compared to the original version DFT 403.

Figure 6:
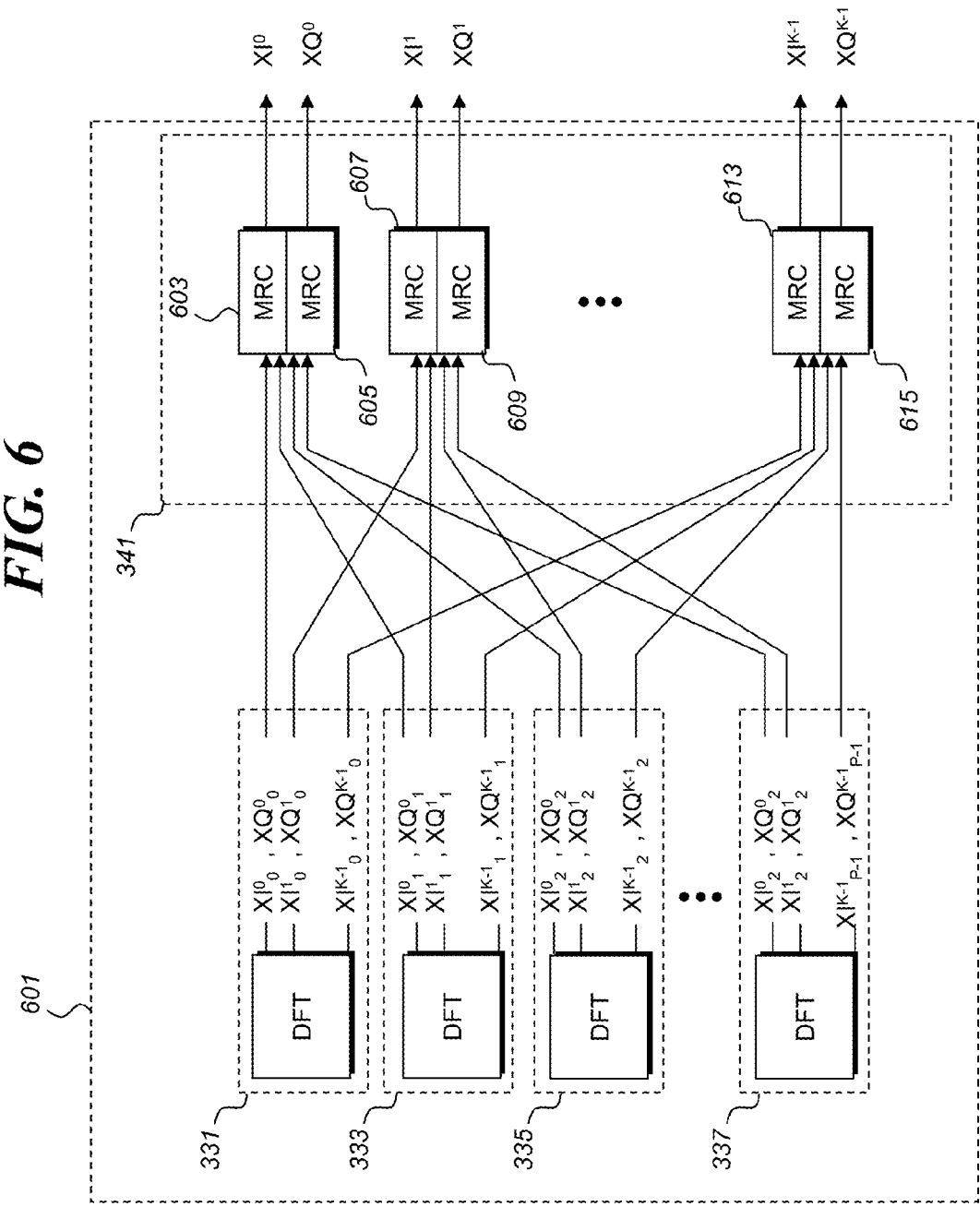
FIG. 6 is a schematic diagram illustrating combining individual sub-carrier Fourier complex coefficients according to disclosed embodiments.

FIG. 6 illustrates an exemplary schematic diagram showing the combination of individual complex Fourier coefficients on a sub-carrier basis to increase the signal-to-noise ratio for each sub-carrier in the OFDM signal. Each DFT block 331, 333, 335 or 337 generates a set of K Fourier coefficients for each in-phase and quadrature component, I-OUT and Q-OUT, respectively. The DFT block 331 generates Fourier coefficients from the original version of the I-OUT/Q-OUT bit stream; DFT 333 generates Fourier coefficients from the time-shifted version delayed by DELAY 1; DFT 335 generates Fourier coefficients from the time-shifted version delayed by DELAY 2; and DFT 337 generates Fourier coefficients from the time-shifted version delayed by DELAY P-1. Therefore, there are in total P DFT blocks, generating P different sets of complex Fourier coefficients, each of which comprises K in-phase Fourier coefficients and K quadrature Fourier coefficients. XI denotes the in-phase Fourier coefficients and XQ denotes the quadrature Fourier coefficients. The subscript of XI and XQ denotes the time shifted versions ranging from 0 to P-1, where 0 denotes the original version. The superscript of XI and XQ denotes the sub-carrier position of the OFDM signal ranging from 0 to K-1.

To enhance the signal-to-noise ratio of each OFDM sub-carrier, all in-phase and quadrature Fourier coefficients belonging to each sub-carrier from P time-shifted versions are maximal-ratio combined in block MRC 603, 605, 607, 609, 613 and 615. For example, for the first sub-carrier case, the in-phase and quadrature components are denoted by $XI^0$ and $XQ^0$ respectively. The P complex Fourier coefficients belonging to $XI^0$, which are $XI^0_0, XI^0_1, \ldots, XI^0_{P-1}$, are maximal-ratio combined by the MRC 603 to generate the $XI^0$. Likewise, The P complex Fourier coefficients belonging to $XQ^0$, which are $XQ^0_0, XQ^0_1, \ldots, XQ^0_{P-1}$ are maximal-ratio combined by the MRC 605 to generate the $XQ^0$.

Figure 7:
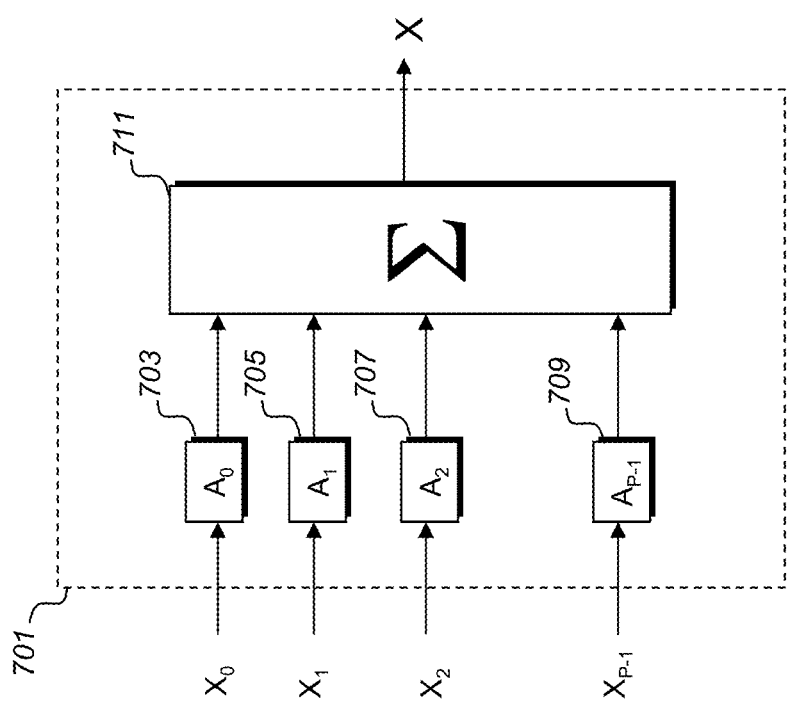
FIG. 7 is a schematic diagram illustrating the MRC structure according to disclosed embodiments.

FIG. 7 illustrates the schematic diagram of the MRC 603, 605, 607, 609, 613, and 615 in FIG. 6. The P complex Fourier coefficients, $X_0, X_1, X_2, \ldots, X_{P-1}$ are scaled linearly by optimum constants $A_0, A_1, A_2, \ldots,$ and $A_{P-1}$ in scalars 703, 705, 707, 709, respectively, which can be calculated from optimization theory, and summed together by the summer 711 so that the resulting Fourier coefficient signal-to-noise at the MRC 701 output, X, is enhanced.

It should be noted that the term communication unit may be used herein to denote a wired device, for example a high speed modem, an xDSL type modem, a fiber optic transmission device, and the like, and a wireless device, and typically a wireless device that may be used with a public network, for example in accordance with a service agreement, or within a private network such as an enterprise network or an ad hoc network. Examples of such communication devices include a cellular handset or device, television apparatus, personal digital assistants, personal assignment pads, and personal computers equipped for wireless operation, and the like, or equivalents thereof, provided such devices are arranged and constructed for operation in connection with wired or wireless communication.

The communication units of particular interest are those providing or facilitating voice communications services or data or messaging services normally referred to as ultra wideband networks, cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks, LTE (Long Term Evolution) networks, and variants or evolutions thereof.

Furthermore, the wireless communication devices of interest may have short range wireless communications capability normally referred to as WLAN (wireless local area network) capabilities, such as IEEE 802.11, Bluetooth, WPAN (wireless personal area network) or Hyper-Lan and the like using, for example, CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A circuit for generating K in-phase and quadrature complex Fourier coefficients based on an OFDM signal modulated by a carrier frequency and having K sub-carriers, comprising:
   a sampling clock generator configured to generate an in-phase sampling clock and a quadrature sampling clock, the quadrature sampling clock being ninety degrees out of phase with the in-phase sampling clock, and the in-phase sampling clock and the quadrature sampling clock having the same frequency;
   a quadrature bandpass-sampling delta-sigma analog-to-digital demodulator (QBS-ADD) configured to
      demodulate the OFDM signal from the carrier frequency down to baseband,
      generate an in-phase signal based on the in-phase sampling clock and the demodulated OFDM signal, and
      generate a quadrature signal based on the quadrature sampling clock and the demodulated OFDM signal;
   first through $P^{th}$ bit processors, each of the first through $P^{th}$ bit processors being configured to
      delay the in-phase signal by an $i^{th}$ delay time equal to $d_i \times D$, to generate an $i^{th}$ delayed in-phase signal, with D being a set delay time,
      delay the quadrature signal by the $i^{th}$ delay time equal to $d_i \times D$, to generate an $i^{th}$ delayed quadrature signal, and
      capture the $i^{th}$ delayed in-phase signal and the $i^{th}$ delayed quadrature signal to generate K in-phase Fourier coefficients and K quadrature complex Fourier coefficients, $j^{th}$ in-phase and quadrature complex Fourier coefficients corresponding to a $j^{th}$ OFDM sub-carrier;
   a maximal ratio combiner configured to
      linearly combine, for each of the first through $K^{th}$ OFDM sub-carriers, the in-phase complex Fourier coefficients from each of the first through $P^{th}$ bit processors to generate a combined in-phase complex Fourier coefficient, thereby generating K combined in-phase complex Fourier coefficients corresponding to the K OFDM sub-carriers, and
      linearly combine, for each of the first through $K^{th}$ OFDM sub-carrier, the quadrature complex Fourier coefficients from each of the first through $P^{th}$ bit processors to generate a combined quadrature complex Fourier coefficient, thereby generating K combined quadrature complex Fourier coefficients corresponding to the K OFDM sub-carriers;
   wherein i is a first index value that varies from 1 to P, and represents a numeric identifier of one of the first through $P^{th}$ bit processors,
   wherein D is equal to the period of the in-phase sampling clock,
   wherein j is a second index value that varies from 1 to K, and represents a numeric identifier of one of first through $K^{th}$ OFDM subcarriers, and
   wherein P and K are integers greater than 1.

2. The circuit of claim 1, wherein each of the first through $P^{th}$ bit processors comprises:
   an $i^{th}$ cyclic prefix removal circuit configured to receive the $i^{th}$ in-phase signal and the $i^{th}$ quadrature signal and to generate an $i^{th}$ reduced in-phase signal and an $i^{th}$ reduced quadrature signal, respectively;
   an $i^{th}$ discrete Fourier transform circuit configured to receive N samples of the $i^{th}$ reduced in-phase signal to generate K in-phase complex Fourier coefficients, and to receive N samples of the reduced quadrature signal to generate the K quadrature complex Fourier coefficients,
   wherein N is a positive integer,
   wherein N is equal to the carrier frequency that modulates the OFDM signal divided by a sub-carrier spacing of the K OFDM sub-carriers.

3. The circuit of claim 1, wherein
   an in-phase signal and a quadrature signal generated from the QBS-ADD are bi-level digital signals.

4. The circuit of claim 1, wherein
   a frequency of the in-phase sampling clock and a frequency of the quadrature sampling clock are both equal to the carrier frequency that modulates the OFDM signal, and the carrier frequency is between 0.5 GHz to 6 GHz.

5. The circuit of claim 1, wherein K is an order of magnitude to three orders of magnitude smaller than N.

6. The circuit of claim 1, wherein P is between 1 and the cyclic prefix duration divided by D, the period of the in-phase sampling clock.

7. The circuit of claim 1, wherein
   $d_i$, i being from first through $P^{th}$, form a set of positive integers,
   $d_i$ is larger than $d_{i-1}$,
   $d_1$ is equal to zero, and
   $d_p \times D$ is smaller than the cyclic prefix (CP) duration.

8. A method for generating K in-phase and quadrature complex Fourier coefficients based on an OFDM signal modulated by a carrier frequency and having K sub-carriers, comprising:
   generating an in-phase sampling clock signal and a quadrature sampling clock signal, the quadrature sampling clock signal being ninety degree out of phase with the in-phase sampling clock signal, and the in-phase sampling clock signal and the quadrature sampling clock signal having the same frequency;
   demodulating the OFDM signal from the carrier frequency to baseband in response to the in-phase sampling clock signal, to generate an in-phase signal;
   demodulating the OFDM signal from the carrier frequency to baseband in response to the quadrature sampling clock signal, to generate a quadrature signal;
   delaying the in-phase signal by first through $P^{th}$ delay times to generate first through $P^{th}$ delayed in-phase signals, an $i^{th}$ delay time being equal to $d_i \times D$, with D being a set delay time;
   delaying the quadrature signal by the first through $P^{th}$ delay times to generate first through $P^{th}$ delayed quadrature signals, an $i^{th}$ delay time being equal to $d_i \times D$;

for each of the first through $P^{th}$ delayed in-phase signals, capturing the $i^{th}$ delayed in-phase signal to generate K in-phase Fourier complex coefficients, $j^{th}$ in-phase complex Fourier coefficient corresponding to a $j^{th}$ OFDM sub-carrier;

for each of the first through $P^{th}$ delayed quadrature signals, capturing the $i^{th}$ delayed quadrature signal to generate K quadrature complex Fourier coefficients, $j^{th}$ quadrature complex Fourier coefficient corresponding to a $j^{th}$ OFDM sub-carrier;

linearly combining, for each of the first through $K^{th}$ OFDM sub-carrier, the P in-phase complex Fourier coefficients generated based on the first through $P^{th}$ delayed in-phase signals to generate a combined in-phase complex Fourier coefficient, thereby generating K in-phase complex Fourier coefficients corresponding to the K OFDM sub-carriers, and linearly combining, for each of the first through $K^{th}$ OFDM sub-carrier, the P quadrature complex Fourier coefficients generated based on the first through $P^{th}$ delayed quadrature signals to generate a combined quadrature complex Fourier coefficient, thereby generating K quadrature complex Fourier coefficients corresponding to the K OFDM sub-carriers;

wherein i is a first index value that varies from 1 to P, and represents a numeric identifier of one of the first through $P^{th}$ bit processors, wherein D is equal to the period of the in-phase sampling clock, wherein j is a second index value that varies from 1 to K, and represents a numeric identifier of one of first through $K^{th}$ OFDM sub-carriers, and wherein P and K are integers greater than 1.

9. The method of claim 8, wherein capturing the $i^{th}$ delayed in-phase signal to generate the K in-phase Fourier complex coefficients comprises:

generating an $i^{th}$ reduced in-phase signal by removing a cyclic prefix from the $i^{th}$ delayed in-phase signal, generating the K in-phase complex Fourier coefficients by using the discrete Fourier transform on N samples of the $i^{th}$ reduced in-phase signal, wherein N is a positive integer, and wherein N is equal to the carrier frequency that modulates the OFDM signal divided by a sub-carrier spacing of the K OFDM sub-carriers.

10. The method of claim 8, wherein capturing the $i^{th}$ delayed quadrature signal to generate the K quadrature Fourier complex coefficients comprises:

generating an $i^{th}$ reduced quadrature signal by removing a cyclic prefix from the $i^{th}$ delayed quadrature signal;

generating the K quadrature complex Fourier coefficients using the discrete Fourier transform on N samples of the $i^{th}$ reduced quadrature signal, wherein N is a positive integer, and wherein N is equal to the carrier frequency that modulates the OFDM signal divided by a sub-carrier spacing of the K OFDM sub-carriers.

11. The method of claim 8, wherein an in-phase signal and a quadrature signal generated from the QBS-ADD are bi-level digital signal.

12. The method of claim 8, wherein a frequency of the in-phase sampling clock signal and a frequency of the quadrature sampling clock signal are both equal to the carrier frequency that modulates the OFDM signal, and the carrier frequency is between 0.5 GHz to 6 GHz.

13. The method of claim 8, wherein K is an order of magnitude to three orders of magnitude smaller than N.

14. The method of claim 8, wherein P is between 1 and the cyclic prefix duration divided by D, the period of the in-phase sampling clock.

15. The method of claim 8, wherein $d_i$, i being from first through $P^{th}$, form a set of positive integers, $d_i$ is larger than $d_{i-1}$, $d_1$ is equal to zero, and $d_p \times D$ is smaller than the cyclic prefix (CP) duration.

* * * * *